Nov. 3, 1931.  T. W. ROLPH  1,830,484
SIGHTING MARK FOR REFRACTORS OR THE LIKE
Filed Sept. 10, 1930
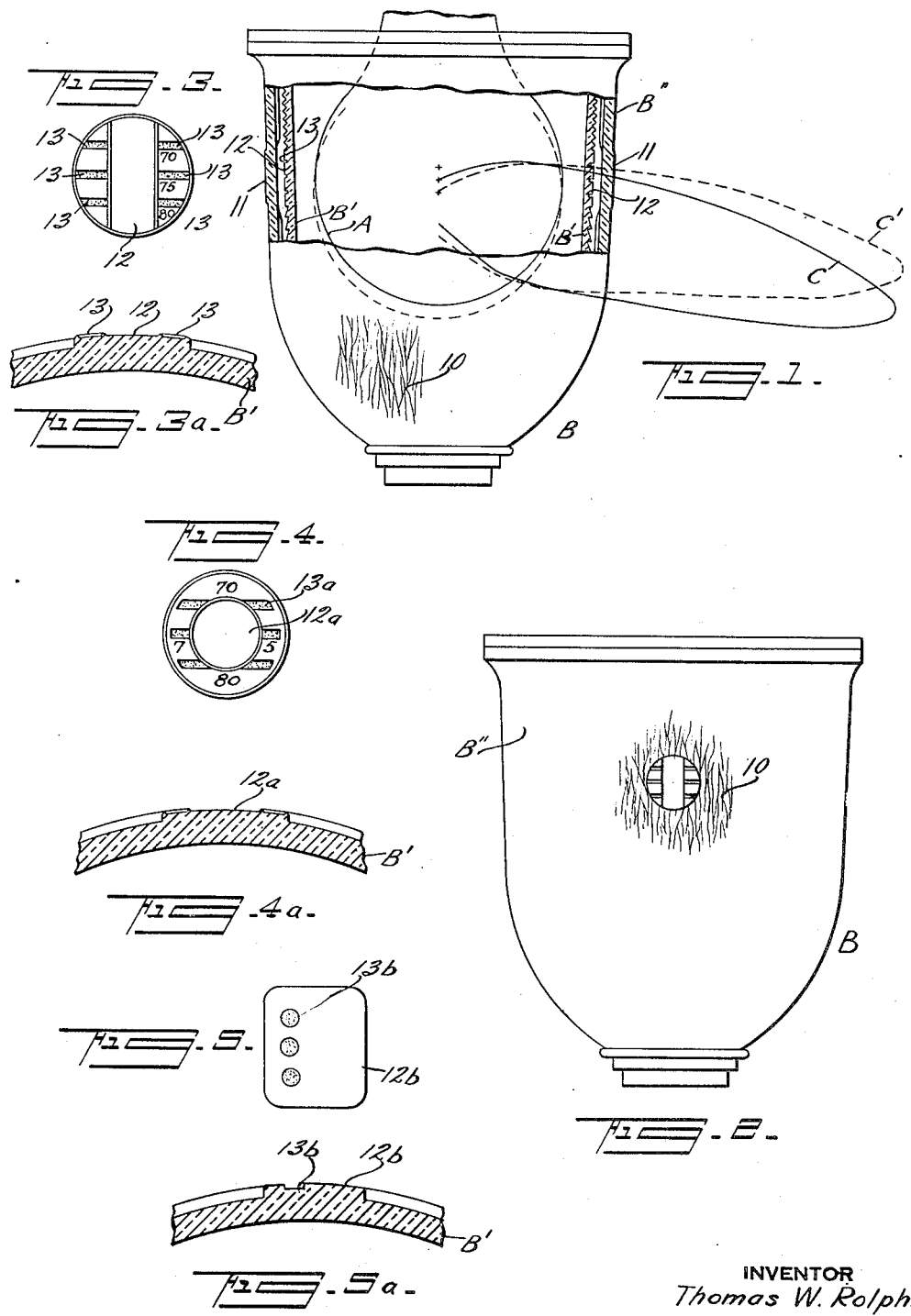
INVENTOR
Thomas W. Rolph.
BY
ATTORNEY Patented Nov. 3, 1931

1,830,484

UNITED STATES PATENT OFFICE

THOMAS W. ROLPH, OF NEWARK, OHIO, ASSIGNOR TO HOLOPHANE COMPANY, INC., OF NEW YORK, N. Y., A CORPORATION OF DELAWARE

SIGHTING MARK FOR REFRACTORS OR THE LIKE

Application filed September 10, 1930. Serial No. 480,825.

The present invention relates to sighting marks for refractors, or the like, and is more particularly directed toward the provision of improved peep holes for use in diffusing, reflecting or refracting glassware.

In refracting glassware it is of great importance that the light source be properly focused or be placed out of focus a predetermined amount to secure the most effective light distribution under the conditions present.

In street lighting, for example, it is desirable to be able to adjust the position of the light source for best distribution according to the mounting height, spacing and street slope. The sighting marks to be described herein are especially useful in these refractors for they make it possible to predetermine the light distribution by focusing in a predetermined manner, with certainty of results even when done in the day time with the lights extinguished.

The present invention contemplates such sighting marks or peep holes as will permit looking through the glass and obtaining a clear view whereby the position of a light source, otherwise obscured from view, may be determined.

This, it has been found, may be obtained by providing transparent sight openings in the glass envelope about the light source with which are associated suitable indicia whereby sighting may be had without distortion of the light rays. The indicia may be cast into the glass and are spaced adjacent the transparent area so the transparent area will be free from unevenness which would cause distortion of the light rays while making an observation.

The accompanying drawings show one form of refractor carrying one form of such sighting marks and a number of forms of sighting marks which may be employed, it being understood that the drawings are illustrative of the invention.

In these drawings:

Figure 1 is a vertical sectional view through a street lighting luminair showing the sight opening and the variation of the light distribution by changing the lamp adjustment;

Figure 2 is an elevational view of the same; and

Figures 3, 4 and 5 are elevational and sectional views and Figures 3a, 4a and 5a are fragmentary sectional views of modified forms of sight openings.

The street lighting luminair shown in Figures 1 and 2 has a light source A in the form of an incandescent lamp carried in the usual focusing mount, as is well understood in this art. The refractor B is a two piece refractor made of pressed glass, the inner envelope being indicated at B' and the outer one at B''. Light distribution curves for varying positions of the light source are indicated in full and dotted lines at C and C', the full line lamp position and full line curve indicating normal conditions for 75° maximum candle power, the dotted lines indicating the lamp lowered to give an 80° maximum beam.

The outside of the refractor may be smooth or it may be corrugated as indicated at 10, while the other surfaces of the glass part may contain light controlling prisms, such, for example, as shown in Patent No. 1,596,006. These prisms and/or corrugations make it impossible to see the light source so as to determine its adjustment and the present invention relates to the provision of sight openings in such refractors whereby one can look through the glass to see the position of the light source.

In the form of sight opening shown in Figures 1, 2, 3 and 3a, the outer envelope B'' has a window or spot 11 of small area, smooth on opposite sides as indicated. Opposite this, the inner refractor part B' has a transparent area or window 12, adjacent to which are marks or indicia pressed into the glass, such, for example, as the figures "70", "75" and "80", which correspond with the angles of maximum distribution of the refractor when the filament is adjusted to be at the elevation of the mark adjacent thereto. The glass is preferably provided with other marks or indicia, such as depressions 13, to receive light contrasting material indicated by stippling. Paint may be used, or the glass may be etched or otherwise treated to facilitate observation.

It is preferable to provide duplicate sighting marks on opposite sides of the refractor, as indicated in Figure 1.

The provision of a transparent non-prismatic area which is smooth and even makes it possible to secure a good view without distortion of light rays which would result, were the indicia cast directly in the sighting area. The optical effect of indicia formed directly in the sighting area is to distort the surrounding glass surface and blur the view.

Figures 4, 4a, 5 and 5a show modified forms of sight openings having transparent areas 12a and 12b, spots 13a and 13b, and the indicia, as indicated. In Figures 5 and 5a, numerals are omitted. The sighting mark may be used with or without numerals, although probably an indication of the maximum angle of candle power obtained will be most frequently desirable. Figures 5 and 5a also indicate that a definite dividing line between the transparent area and the indicia is not necessary, although usually desirable. It will, of course, be understood that the present invention may be employed in one piece refractors, or in reflectors, or in connection with simple diffusing glassware.

It will also be understood that the sight openings occupy but a comparatively small portion of the surface of the refractor and that they do not interfere with its general light distribution.

I claim:

1. A luminair comprising a light source, and a translucent envelope about the light source through substantially all the surface of which direct viewing of the light source is impossible, a small portion of the area of said envelope being transparent to permit direct viewing the light source, and indicia adjacent to said portion.

2. A luminair comprising a light source and a refractor about the light source, the prism formation of the refractor obscuring the light source from direct view except for a sight opening therein, said sight opening comprising a transparent area of non-prismatic cross section, and indicia cast into the glass adjacent thereto.

3. A sight opening for a refractor comprising a non-prismatic transparent area adjacent which are indicia pressed into the glass.

4. A sight opening for a refractor comprising a non-prismatic transparent area adjacent which are indicia, pressed into the glass, the indicia bearing light contrasting material to facilitate making observations.

5. A luminair comprising a two piece refractor about a light source, the prism formation of each of the refractor parts obscuring the light source from direct view except for a sight opening in each part aligned with a sight opening in the adjacent part, the sight opening in one refractor part comprising a transparent area of non-prismatic cross section and adjacent indicia pressed into the glass, the sight opening in the other refractor part comprising a transparent area of sufficient size to permit viewing the indicia on the other refractor part and the light source through the transparent area of the other refractor part.

Signed at New York in the county of New York and State of New York, this 8th day of September, 1930.

THOMAS W. ROLPH.